United States Patent Office 3,746,662
Patented July 17, 1973

3,746,662
CONDUCTIVE SYSTEMS
Robert Leonard Adelman, Wilmington, Del., assignor to E. I. du Pont de Nemours and Company, Wilmington, Del.
No Drawing. Filed Aug. 9, 1971, Ser. No. 170,308
Int. Cl. H01b 1/02
U.S. Cl. 252—513    19 Claims

ABSTRACT OF THE DISCLOSURE

Polymerizable suspensions for the formation of thermally and/or electrically conductive coatings comprising (a) certain epoxy resins having a viscosity at 25° C. below 10 poises, said epoxy resins having dispersed therethrough (b) certain tough polymer particles, (c) finely divided metal particles and (d) a curing agent for (a). Also objects incorporating the cured dispersion, such as tantalum capacitors incorporating the same.

BACKGROUND OF THE INVENTION

This invention relates to conductive adhesives, and more particularly to embedding compositions or coating compositions of low viscosity.

Polymer composites are blends of polymers with other polymers and/or fillers to modify the properties of the polymer as desired. Addition of powdered metals to polymers is well known, e.g., Collings U.S. Pat. 2,444,034 discloses the incorporation of noble metals and J. E. Ehrreich et al. U.S. Pats. 3,476,530 and 3,140,342 disclose noble metal-coated substrates to give electrical conductivity to the polymer. The use of other metals such as copper, aluminum, iron or zinc at somewhat lower concentrations gives limited or no electrical conductivity, but good thermal conductivity. Both types of metal additives to polymers result in improvement in thermal shock resistance; some improvement in tensile strength, compressive stress, crack and impact resistance; improved machinability; and reduced exotherm during curing. The improved thermal properties, particularly coefficient of expansion, lead to reduced internal stresses and consequently potential use as embedding materials or adhesives. However, in uses such as conductive coatings or as conductive adhesives on polymeric or ceramic substrates, adhesion to substrate is usually only fair (see "Printed and Integrated Circuitry," T. D. Schlabach and D. K. Rider, McGraw-Hill, New York, 1963, pp. 106–107). Furthermore, increased metal loading in the polymers to improve electrical or thermal conductivity leads to very high viscosity in solvent-free systems. This makes application difficult and results in reduced impact and peel strength of the cured composition (see "Plastics for Electronics," C. A. Harper, Kiver Publications, Chicago, 1964, p. 62).

Also known is the addition of tough rubbery polymers to modify the properties of a second polymer. However, these have been added to give essentially soluble, homogeneous blends when heated, the rubbery tough phase coming out of solution after heating or after polymerization of the monomers present. Further, the rubbery particles that come out of solution according to the prior art are of very small particle size, the art indicating that significant improvement in toughness of the composite results only if the rubbery particle phase has particles less than 0.6–1.0 micron in diameter (see "Encyclopedia of Polymer Sciences and Technology," Wiley, New York, 1969, vol. 10, p. 703).

SUMMARY OF THE INVENTION

The present invention provides suspensions of metal particles in polymers which provide electrically and/or thermally conductive adhesives, embedding compositions or coating compositions which are sufficiently low in viscosity to be readily applicable when they contain less than 10–12% solvent, which have good conductivity (volume resistivity less than 0.1 ohm-cm. or thermal conductivity greater than 6 B.t.u./hr./ft.$^2$/° F./inch thickness, that is, greater than 0.02 watts/in. $^2$/° C./inch), depending upon the formulation selected, and also exhibit good adhesion to ceramics, metals or plastics, as shown by good shear strength and peel strength values thereon.

Such adhesives are applied as a largely solvent-free conductive suspension, which is applicable under moderate or atmospheric pressure (less than several atmospheres). The polymerizable suspensions of the present invention comprise (a) a glycidyl ether epoxy resin having a viscosity at 25° C. below 10 poises and an epoxy functionality of at least two, said epoxy resin having suspended therein (b) particles of a tough polymer having carboxy, hydroxy, amino or isocyanate substituents, which polymer is insoluble in (a) but reactive therewith upon curing of (a),
(c) finely divided metal particles and
(d) a curing agent for (a), the volume ratio of (c) to (a) being in the range 0.03 to 0.6/1., and the weight ratio of (b) to (a) being in the range 0.02 to 0.5/1.

DETAILED DESCRIPTION

The four components of the inventive polymerizable dispersions are (a) a glycidyl ether epoxy resin, having suspended therein (b) tough polymer particles, (c) finely divided metal particles and (d) a curing agent for the epoxy resin. The epoxy resins are employed due to the good adhesion to various substrates without requiring careful surface conditioning, due to the ease with which they are cured, and since they permit the formation of a stable one-package system. Furthermore, they permit the use of essentially solvent-free systems, which solvent-free systems lead to maximum adhesion or bubble-free coatings, and/or encapsulants exhibiting a minimum of shrinkage.

To achieve such low viscosity solvent-free systems of good thermal and/or electrical conductivity, aliphatic epoxies of the glycidyl ether type containing hydroxyl, amino or carboxyl groups are used. The epoxy resins used in this invention have a viscosity at 25° C. below 10 poises and an epoxy functionality of at least two.

An epoxy functionality of two corresponds to an average of two epoxy groups per molecule; the epoxy functionality is determined according to the method set forth by H. Lee and K. Neville in "Epoxy Resins," McGraw-Hill, New York, 1957, pages 21–28. Specifically, the epoxy functionality is the ratio of the average molecular weight (determined ebullioscopically) to the epoxide equivalent (the weight of epoxy resin in grams which contains one gram equivalent of epoxy radical).

Specific epoxies used where good electrical conductivity is desired include the glycidyl ether of glycerol (Shell Chem. Co. "Epon" 812) which is largely

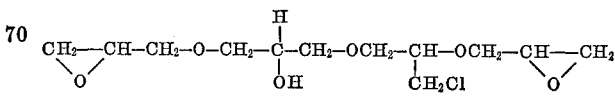

viscosity 100–170 cps., along with some trifunctional derivative

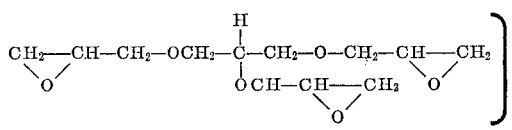

the diglycidyl ether of 1,4-butanediol (viscosity 19 cps.) or the diglycidyl ethers of polypropylene glycol (degree of polymerization about 4 to 9, viscosities 30–100 cps.), which have been slightly reacted with phthalic anhydride or dodecenylsuccinic anhydride. Other low viscosity cylcidyl ether type of epoxies which can be used include the diglycidyl ether of linoleic dimer acid ("Epon" 871, viscosity 400–940 cps.); polyallyl glycidyl ether (viscosity 510 cps.); and resorcinol diglycidyl ether (Ciba Products Co., "Araldite" ERE–135–9, viscosity 500 cps.), which would all be reacted slightly with an anhydride to develop conductive qualities.

Somewhat higher viscosity glycidyl ether type epoxies can be blended with the above difunctional or polyfunctional epoxies of viscosity less than 10 poises at 25° C., without serious increases in viscosity, provided some very low viscosity monofunctional reactive diluents such as allyl glycidyl ether, butyl glycidyl ether, or phenyl glycidyl ether are present. The reactive diluent is present in the epoxy up to a maximum total of no more than 15–20% by weight of total epoxy and diluent. Since the epoxy itself has a minimum epoxy equivalent of about 2, the epoxy functionality of epoxy and diluent is about 1.6. Examples of higher viscosity epoxies are the diglycidyl ethers of Bisphenol A (Shell's "Epon" 828 and 826, viscosity 10,000–16,000 cps. and 6500–9500 cps., respectively), the polyglycidyl ether of phenol formaldehyde Novolac resin (Ciba's "Araldite" EPN 1139, viscosity 1700 cps. at 52° C.), and pentaerythritol triglycidyl ether.

Various other epoxy compounds can be used in small amounts as extenders, such as vinyl cyclohexene diepoxide (Ciba's "Araldite" RD–4, viscosity 20 cps.), butadiene diepoxide, octylene oxide or styrene oxide.

The desired aliphatic epoxy resins may be prepared by reaction of the appropriate hydroxy compounds with epichlorohydrin, in the presence of a Lewis acid catalyst (BF₃), and the resulting adduct then treated with strong base (U.S. 2,538,072, Zeck). A one-step synthesis using caustic is also possible (Zuppinger, U.S. 2,898,349).

Electrical conductivity is greatly reduced using epoxies of varying viscosity with diluent unless the epoxy resin or blend is heated to 125° C. for a few minutes with an anhydride such as phthalic anhydride or dodecenylsuccinic anhydride to modify it somewhat, prior to addition thereto of the metal particles and polymer particles. Such partially reacted epoxy blends have added stability if a small amount of acetone (up to 5–10%) is added. This may be a result of a cyclic ketal complex forming between the acetone and the epoxy group.

In the event that high thermal conductivity, rather than high electrical conductivity, is desired in the products made with the suspensions of the present invention, then the epoxy systems mentioned above can be used without previous anhydride treatment. Furthermore, although systems of high electrical conductivity would employ noble metal particles, in systems of high thermal conductivity non-noble metals such as copper, aluminum, zinc and iron would be employed. By the term "noble metals" is meant platinum, gold, palladium, silver, ruthenium, rhodium, osmium, irridium, and alloys and mixtures thereof.

Component (d), the epoxy curing agent or catalyst, is one of the conventional curing agents for the glycidyl ether type of epoxy resins. Such curing agents are described by H. Lee and K. Neville in "Handbook of Epoxy Resins," McGraw-Hill, New York, 1967, or their book entitled "Epoxy Resins," McGraw-Hill, 1957. Likewise, the usual amounts of such curing agents are employed, such as described by Lee and Neville, e.g., in the latter book at pages 251–252. The preferred epoxy curing agent is a latent, high temperature curing agent such as dicyandiamide. Dicyandiamide is insoluble in the above-described epoxies, and is added thereto as a finely ground powder (passes through a No. 60 screen, U.S. scale). Systems employing such curing agents have excellent storage stability at room temperature (at least several weeks) and cure at a rather rapid rate at elevated temperatures (e.g., at temperatures above 150° C.). Other curing agents which can be used if preheated with the epoxy before blending with the metal, but which require much longer curing time (e.g., 2–8 hours at 150° C.), are acid anhydrides such as phthalic anhydride, maleic anhydride, and dodecenyl succinic anhydride.

The powdered tough polymer component of the dispersions of the present invention, if properly chosen, gives cured products having excellent peel strength characteristics. These polymers should have (1) high cohesive strength and toughness (here toughness is defined as tensile strength multiplied by ultimate elongation), that is, where the toughness value is greater than 200,000 (lbs./in.²)(percent), (2) low solubility or swellability in the above-described epoxies, and (3) functional groups capable of covalent bond formation with the polymerizing epoxy, e.g., —COOH, —OH, —NH₂. Exemplary of such tough polymers are certain ethylene copolymers, such as ethylene/vinyl acetate or ethylene/ethyl acrylate copolymers containing pendant carboxyl groups (from acrylic acid, methacrylic acid, itaconic acid, maleic anhydride, crotonic acid), ethylene copolymers containing pendant tertiary amino groups (from dimethylaminoethyl methacrylate, etc.), or ethylene copolymers containing pendant hydroxyl groups (from hydroxyethylacrylate, etc.). Another group of ethylene copolymers is the ethylene/vinyl alcohol copolymers. Still another group of polymers is the linear aliphatic polyamides which have amino and/or carboxyl end groups, particularly the relatively soft, low melting, solvent-soluble variety such as a 6/6 nylon, such as Du Pont's "Zytel" 63 resin. Linear thermoplastic polyurethanes or polyesters, which have hydroxyl or carboxyl end groups, are also useful. Other polymers having the above criteria will be evident to those skilled in the polymer art.

These tough polymers (b) are powdered or finely divided, that is, they pass through a No. 16 screen. They can be quite coarse (pass through a No. 16 screen, but collect on a No. 60 screen) or even fine enough to pass through a No. 100 screen. The particles are prepared mechanically by grinding mills, etc., below the glass transition temperature of the polymer or by spray drying. The coarsest particles mentioned above give satisfactory strength performance in the cured product of the present invention, but might be unsatisfactory for some surfaces or joints where tolerances are close or where esthetic appearance is important. Thus, where the tough polymer particles pass through a No. 100 screen, a very smooth homogeneous appearance results.

The metals in the suspensions of the present invention are important for the electrical conductivity, thermal conductivity, thermal shock resistance, reduced coefficient of expansion and reduced exotherm during curing. Moreover, in the present suspensions the powdered metals add body and thixotropy which prevents settling and separation of the suspended polymer from the epoxy medium during curing. Furthermore, in some cases, such as particulate silver, the metal actually catalyzes the curing reaction.

The form of the metal particles can be spherical grindings, filings, chips or flakes, or spongy amorphous agglomerates, or even irregular crystallites, depending upon the experimental conditions during chemical or galvanic reduction of ions to produce the metal particles. Metal particle sizes in the suspensions of the present invention can be in the range of about 1–30 microns, with all particles passing through a No. 100 screen and most of the particles passing through a No. 200 screen (U.S. Scale). Where electrical conductivity is important, to achieve volume resistivities in the final cured product of 0.1 ohm-cm. or less, it is preferred that the particles be noble metals or composite particles having a coating of noble metals on non-noble metals such as copper, aluminum, iron, nickel or cobalt. The noble metals may also be coated on glass or on plastic particles (such as on polystyrene beads, etc., as disclosed in Salyer et al. U.S. Pat. 3,359,145). Where thermal conductivity is important, other particulate corrosion-resistant metals or alloys can be used instead of the noble metals, such as copper, aluminum, zinc, chromium, bronze, tin, titanium or tungsten.

In addition to components (a), (b), (c) and (d), small amounts of other additives may be used in the suspensions of the present invention. For example, water resistance of the cured product may be slightly improved by the addition of about 1%, based on the weight of the metal, gamma-aminopropyl triethoxy silane (Union Carbide A–1100 silane) or an epoxy silane (Union Carbide A–187). Further additives for thixotropy, etc., may include small amounts of finely divided silica, bentone or mica.

In the suspensions of the present invention proportions of metals are as follows. The volume ratio of metals (c) to epoxy (a) is in the range of 0.03–0.6/1., preferably 0.06–0.3/1.; the weight ratio of tough polymer (b) to epoxy (a) is in the range 0.02–0.5/1., preferably 0.05–0.25/1.

The suspensions of the present invention may be applied to a substrate by any conventional technique, e.g., by dipping, spraying, printing, coating.

After application, when dicyandiamide is the curing agent, the polymerizable suspension is conveniently cured by raising the temperature above 120° C., preferably in the range 150–180° C., for sufficient period of time to result in epoxy polymerization and reaction at the interface of the tough polymer particles and the epoxy resin. Typical heating times to effect curing in the temperature range 150–180° C. are in the range 30 minutes-two hours. Higher temperatures and longer times are required for curing when the curing agent is an acid anhydride.

The following examples and comparative showings are presented to illustrate the present invention. Percentages and parts are by weight unless otherwise specified. Mesh sizes are U.S. Standard Sieve Scale.

Lap shear strength was determined with ½-inch overlap on 31-mil brass stock pulling at 0.2 inch/minute. T-peel strength was determined on 5-mil brass, 8-mil glue line, pulling at the rate of 2 inches/minute.

COMPARATIVE EXAMPLE 1

This comparative showing illustrates the necessity of having finely divided metal present according to the present invention. In this comparative showing no metal is present, only epoxy and the tough polymer.

Four grams of a low viscosity epoxy resin containing hydroxyl groups (Shell Chemical Co., "Epon" 812, epoxy equivalent 140–160, average molecular weight 306, viscosity 100–170 cps. at 25° C., 10% tightly bound chloride) was mixed with 0.8 gram of a finely divided (200–300 mesh) ethylene/vinyl acetate/vinyl alcohol terpolymer (74/2.5/23.5 by weight, melt index 20–40 at 190° C., 2160 grams load on the indexer) and 0.4 gram of dicyandiamide (as an epoxy curing agent) which has been ground with a mortar and pestle. The weight ratio of tough polymer to epoxy was 0.2/1. After the blend was mixed by hand, it was further homogenized in a Hoover Muller. An apparently homogeneous stable suspension was produced. However, on heating a cast film (draw-down) of that blend in an air oven at 175° C. for 30 minutes, extensive separation of the blend components was observed, leading to a very heterogeneous cured (175° C., 30 minutes) product.

EXAMPLE 2

This example illustrates the excellent results achieved with the blends of the present invention. The volume ratio of metals to epoxy was 0.2/1. and the weight ratio of tough polymer to epoxy is 0.2/1.

To the tough polymer/epoxy/dicyandiamide blend of Example 1 was added 8 grams of finely divided silver powder (particle size about 2–5 microns, all passing through a 325-mesh screen). Mixing as in Example 1 resulted in a pourable homogeneous paste which was somewhat thixotropic. Viscosity was about 50 poises at 100 sec.$^{-1}$ (Rotovisco Viscometer); the paste appeared shelf stable at room temperature for over 1 month. A temperature-programmed differential scanning calorimetric determination indicated that on curing, the exotherm initiated at 125° C., reaching a maximum at 172° C., with completion of curing at about 220° C. When run isothermally at 180° C., curing was complete in 10 minutes; in 8 minutes at 190° C.; and in 6 minutes at 200° C.

A pattern was screen printed (100-mesh screen) with the blend on a prefired alumina chip, followed by curing at 175° C. for 30 minutes. Volume resistivity was found to be 0.005 ohm-cm. Lap shear strength was greater than 1800 p.s.i. and T-peel strength was 3.5 lb./in.

This Example 2 illustrates the excellent homogeneity and stability of the compositions of the present invention, as distinguished from Comparative Example 1 which contained no metal.

COMPARATIVE EXAMPLE 3

This shows the superior peel strength of the composition of the present invention set forth in Example 2 over a composition which contained no suspended tough polymer. In this comparative showing the volume ratio of metal to epoxy was the same as in Example 2.

A blend of 8 grams of the finely divided silver of Example 2, 4 grams of "Epon" 812 and 0.4 gram of dicyandiamide were mixed as in Example 1 and the viscosity of the blend was similar to that of Example 2. The curing rate was similar to that of Example 2, and conductivity was slightly higher (volume resistivity 0.003 ohm-cm.). However, lap shear strength was reduced to 1500 p.s.i. and T-peel strength was significantly reduced to only about 0.8 lb./in. Tensile bars were stiff and somewhat brittle.

When this comparative showing was repeated with a small amount (0.04 gram) of Carbide and Carbon Chemical Corporation A–187 epoxy silane in the blend, no change in conductivity resulted with respect to the above comparative showing, lap shear strength was further reduced to 1050 p.s.i. and T-peel strength was 0.9 lb./in.

EXAMPLE 4

In this example the volume ratio of metal to epoxy and the weight ratio of tough polymer to epoxy were as in Example 2. The process of Example 2 was repeated with the exception that a polyamide was substituted for the terpolymer used in Example 2 as the tough polymer. The polyamide was high molecular weight linear interpolymer having a low-softening point, which passed through a 60-mesh screen. Conductivity of the cured (175° C./30 minutes) composition was high (volume resistivity 0.003 ohm-cm.), lap shear strength was 1500–1600 ps.i. and T-peel strength was 3.4 lb./in.

EXAMPLE 5

This example, as Example 4, was identical to Example 2 except in that a different tough polymer was used. The tough polymer was a 71/28/1 (by weight) ethylene/vinyl acetate/methacrylic acid terpolymer, melt index 6. The terpolymer particles were quite coarse, passing through a 16-mesh screen but not passing through a 100-mesh screen. High peel strength adhesives were produced; the coatings were flexible and homogeneous but of somewhat tough texture. Nevertheless, conductivity was high (volume resistivity 0.003 ohm-cm.), lap shear strength was lower (550 p.s.i.), and T-peel strength was high (9.1 lb./in.).

EXAMPLE 6

In this example the volume ratio of metal to epoxy was as in Example 2. The weight ratio of tough polymer to epoxy was 0.1/1. This example shows that adjustments to the level of tough polymer (in this example the ratio of tough polymer to epoxy is one-half that in Example 2) can alter the balance of lap shear strength to T-peel strength. Using a weight ratio of 8/4/0.4/0.4 silver/"Epon" 812/terpolymer of Example 5/dicyandiamide, rather than the 8/4/0.8/0.4 weight ratio of Example 5, there was produced a conductive product which was tough and flexible upon curing (175° C./30 minutes) with a lap shear strength of 1520 p.s.i. and a T-peel strength of 10 lb./in. (in this example the terpolymer collected on an 80-mesh screen).

EXAMPLE 7

This example was identical to Example 6 except that the terpolymer was of finer particle size (passed through an 80-mesh screen) and silver flake was used rather than silver powder. The silver flake passed through a 200-mesh screen. The lap shear strength was 1600 p.s.i. and the T-peel strength was 5.1 lb./in.

COMPARATIVE EXAMPLE 8

The tough polymers of the present invention are insoluble in the epoxy component of the present invention. To illustrate that a soluble toughening epoxy will not serve the function of these insoluble tough polymers, this comparative showing was made using a soluble toughening epoxy ("Epon" 828), but no particular toughening polymer.

This comparative showing was run as was Comparative Example 3, which had no tough polymer. Using a weight ratio of 8/4/1.3/0.53 silver powder of Example 6/"Epon" 812/"Epon" 828/dicyandiamide, a cured film (175° C., 30 minutes) was obtained which was hard but not brittle. Lap shear strength was improved to 2100 p.s.i., but T-peel strength was only 0.9 lb./in. Conductivity dropped considerably (volume resistivity 0.79 ohm-cm.) in that the polar character in the epoxy blend had been reduced.

COMPARATIVE EXAMPLE 9

The importance of having polar groups such as hydroxyl or free carboxyl on the epoxy in developing conductivity is shown by the following. Cured products were prepared according to the procedure of Example 2, without tough polymer, from a weight ratio of 8/4/0.4 silver powder/"Epon" 812/dicyandiamide had high conductivity (volume resistivity 0.00090–0.00300 ohm-cm.) whereas a similar blend substituting "Epon" 828 which has a very low hydroxy group content lead the products with quite high volume resistivity (in excess of $10^4$ ohm-cm.). Blends similar to the latter with weight ratio as high as 28/4/0.4 were, likewise, essentially non-conductive.

It was observed that when "Epon" 828 was heated with phthalic anhydride at 125° C. for a few minutes, then cooled and added to silver powder and dicyandiamide, tremendously increased conductivity was observed after curing at 160° C. for 2 hours (volume resistivity 0.00013 ohm-cm.).

EXAMPLE 10

The compositions of the present invention were herein used to make a tantalum capacitor.

According to prior art procedures a tantalum electrode is first prepared by sintering a porous capsule of pressed tantalum powder in a controlled atmosphere at approximately 125° C. The pellet is then placed in a forming bath and an oxide coating is developed over its surface. A solid electrolyte (a manganous salt) is introduced into the pores of the resultant tantalum object, which salt is converted to manganous dioxide by heating. The object is then coated with graphite to achieve improved electrical contact. Then a conductive silver film is applied to make contact with the graphite and to furnish good contact with subsequent solder applied by dipping, which acts as a conductive coating adhesive to the tantalum electrode and to the external wire lead. The unit is then encapsulated, often with an epoxy. This well known system has many deficiencies such as poor peel strength (adhesion) of the solder to the lead wire or to the conductive silver film and bubble formation due to elimination of solvent or gaseous decomposition products. Likewise, the silver coating also may have poor adhesion to the graphite-impregnated electrode.

The composition of this invention set forth in Example 2 proved to be an excellent alternative eliminating both the silver conductor layer and the solder, and, of course, the steps involved therewith. A graphite-impregnated tantalum electrode and an external lead wire held in close configuration (about ⅛-inch apart) by a temporary jig were dipped into the composition of Example 2 for a few seconds. Upon removal, the coated assembly was immediately baked in an air oven at 175–180° C. for 10 minutes. No sagging was observed. A hard, tough adherent coating to both the electrode and the lead wire resulted, and showed better peel strength than when solder was used. It had good conductivity. The unit was then readily encapsulated and gave off no gas.

What is claimed is:

1. A polymerizable suspension for formation of conductive coatings comprising
   (a) a glycidyl ether epoxy resin having a viscosity at 25° C. below 10 poises and an epoxy functionality of at least about 2,
   said epoxy resin having suspended therethrough
   (b) particles of a tough polymer, toughness greater than 200,000 (lbs./in. sq.) (percentage) and having a particle size small enough to pass through a number 16 screen, said polymer, having carboxy, hydroxy, amino or isocyanate substituents, which polymer is insoluble in (a) but reactive therewith upon curing of (a),
   (c) finely divided metal particles, having a particle size of less than about 30 microns, and
   (d) a curing agent for (a),
   the volume ratio of (c) to (a) being in the range 0.03 to 0.5/1., and the weight ratio of (b) to (a) being in the range 0.02 to 0.5/1.

2. A suspension according to claim 1 wherein (a) additionally comprises a more viscous glycidyl ether epoxy resin and up to about 20% by weight of a low viscosity monofunctional reactive diluent, based upon the total weight of epoxy and diluent; the overall viscosity of (a) being below 10 poises at 25° C. and the overall epoxy functionality of (a) being at least 1.6.

3. A suspension according to claim 1 wherein the volume ratio of (c) to (a) is in the range of 0.06–0.3/1. and the weight ratio of (b) to (a) is in the range 0.05–0.25/1.

4. A suspension according to claim 1 wherein (b) is an ethylene/vinyl alcohol copolymer.

5. A suspension according to claim 1 wherein (b) is an ethylene/vinyl acetate/methacrylic acid terpolymer.

6. A suspension according to claim 1 wherein (b) is an aliphatic polyamide.

7. A suspension according to claim 1 wherein (c) is finely divided silver powder or flake.

8. A suspension according to claim 1 wherein (c) is finely divided silver-coated nickel.

9. A suspension according to claim 1 wherein (c) is finely divided aluminum powder.

10. A suspension according to claim 1 wherein (c) is finely divided copper powder.

11. A suspension according to claim 1 wherein (a) is a reaction product of glycerol with about 3 moles of epichlorohydrin per mole of glycerol.

12. A suspension according to claim 1 wherein (a) is a blend of the resin of claim 11 with (i) a diglycidyl ether of Bisphenol A and (ii) allyl glycidyl ether.

13. A suspension according to claim 1 wherein catalyst (d) is dicyandiamide.

14. Conductive objects containing the polymerized suspension of claim 1.

15. Conductive objects containing the polymerized suspension of claim 2.

16. Conductive objects containing the polymerized suspension of claim 3.

17. Conductive objects containing the polymerized suspension of claim 4.

18. A process for the preparation of a tantalum capacitor comprising the steps of immersing a tantalum electrode and a lead wire in the composition of claim 1, and then curing said composition at elevated temperature.

19. A process according to claim 18 using the composition of claim 2.

References Cited

Pawsons, C. F., and E. L. Suck, Jr., "Substrate Particle Size in ABS Graft Polymers," Advances in Chemistry Series, American Chemical Society, Washington, D.C. (1971), pp. 340–350.

Soldator, A.C. and A. S. Burhans, "Reinforcement of Thermosetting Cycloaliphatic Epoxy Systems With Elastomers," Advances in Chemistry Series, American Chemical Society, Washington, D.C. (1971), pp. 531–546.

CHARLES E. VAN HORN, Primary Examiner

U.S. Cl. X.R.

117—227, 230, 161 ZB; 252—512, 514; 260—37 M, 37 EP; 317—258